United States Patent
Kojima et al.

(10) Patent No.: US 6,909,880 B2
(45) Date of Patent: Jun. 21, 2005

(54) UPDATING METHOD FOR A TARGET SIR IN UPLINK OUTER LOOP CONTROL

(75) Inventors: Masahiko Kojima, Tokyo (JP); Efthymiou Nektaria, Leatherhead (GB)

(73) Assignee: NEC Corporation, Tokyo (JP)

(*) Notice: Subject to any disclaimer, the term of this patent is extended or adjusted under 35 U.S.C. 154(b) by 675 days.

(21) Appl. No.: 09/906,365

(22) Filed: Jul. 16, 2001

(65) Prior Publication Data

US 2002/0173330 A1 Nov. 21, 2002

(30) Foreign Application Priority Data

May 17, 2001 (GB) .............................. 0112080

(51) Int. Cl.$^7$ .............................................. H04B 15/00
(52) U.S. Cl. .................. 455/63.11; 455/67.11; 455/67.13; 455/69; 455/522; 455/560; 455/561
(58) Field of Search .................... 455/63.11, 67.11, 455/67.13, 69, 522, 560, 561

(56) References Cited

U.S. PATENT DOCUMENTS 6,285,886 B1 * 9/2001 Kamel et al. ............... 455/522
6,298,241 B1 * 10/2001 Hong ........................ 455/522

FOREIGN PATENT DOCUMENTS

| EP | 1 067 706 A1 | 1/2001 |
|---|---|---|
| GB | 2351420 A | 12/2000 |
| GB | 2363034 A | 12/2001 |
| WO | WO 98/56120 | 12/1998 |
| WO | WO 00/35120 | 6/2000 |
| WO | WO-00/48336 A1 | 8/2000 |

OTHER PUBLICATIONS

European Search Report dated Aug. 30, 2002.

* cited by examiner

Primary Examiner—Harry S. Hong
Assistant Examiner—Quynh H. Nguyen
(74) Attorney, Agent, or Firm—Dickstein, Shapiro, Morin & Oshinsky, LLP.

(57) ABSTRACT

A mobile system wherein updating of a target SIR is carried out as an uplink outer loop power control by a radio network controller provided with a wait-timer which produces a time-out signal when the wait-timer times a preselected time duration after the wait-timer is set.

8 Claims, 4 Drawing Sheets

UPDATING METHOD FOR A TARGET SIR IN UPLINK OUTER LOOP CONTROL

BACKGROUND OF THE INVENTION

This invention relates to a method for realizing an uplink outer loop power control carried out as a part of transmission power control in a third-generation mobile system.

Uplink (UL) inner loop power control and uplink outer loop power control are carried out as transmission power control in a third-generation (3G) mobile system and are defined in 3G TS25.401 UTRAN Overall Description in outline.

The third-generation mobile system generally includes a radio network controller, a node connected to the radio network controller by a wire or a signal transmission line, and a user equipment which is typically a mobile station. The node is typically a base station and has a service area. Within the service area of the node, the user equipment can communicate with the node by radio communication or wireless communication.

In the third-generation mobile system, the uplink inner loop power control and the uplink outer loop power control are carried out as the transmission power control in order to suppress a radio interference and to obtain a high communication quality.

In the uplink inner loop power control, the user equipment transmits a signal to the node by the use of an uplink dedicated physical control channel for the user equipment. The node receives the signal as a desired wave from the uplink dedicated physical control channel. In this event, the node unavoidably receives an interference wave from other channels. When the node receives the signal, the node measures a ratio of a power of the desired wave to another power of the interference wave as a measured SIR (Signal to Interference Ratio) and compares the measured SIR with a reference value which is called a target SIR in the art. When the measured SIR is smaller than the target SIR, the node transmits, by the use of a downlink dedicated physical control channel for the user equipment, to the user equipment an increment command indicative of increment of a transmission power of the signal to make the user equipment increase the transmission power of the signal. When the measured SIR is larger than the target SIR by a predetermined amount or value, the node transmits, by the use of the downlink dedicated physical control channel for the user equipment, to the user equipment a decrement command indicative of decrement of the transmission power of the signal to make the user equipment decrease the transmission power of the signal.

In the uplink outer loop power control, the radio network controller updates the target SIR of the node into a new target SIR which is a new reference value. In order to update the target SIR of the node, it is necessary that the radio network controller knows a radio condition around the node by receiving a report transmitted from the node. The report represents whether the radio condition has an excessive quality or a degraded quality. In order to produce the report, the node has to measure a block error ratio (BLER) of an uplink signal from the user equipment for a predetermined time duration. The node transmits to the radio network controller a measurement result of the block error ratio (BLER) as the report to make the radio network controller update the target SIR of the node into the new target SIR in accordance with the report. However, the radio condition around the node inevitably change with time. The radio condition is very likely to have a different condition at the instant when the radio network controller updates the target SIR of the node into the new target SIR in accordance with the report received from the node.

In particular, it is defective in that the node consumes a long time in measurement in order to judge that the radio condition has the excessive quality. In order to judge that the radio condition has the excessive quality, the node has to measure a predetermined number of measurements and to compare the measured result with a threshold value for the excessive quality.

SUMMARY OF THE INVENTION

It is an object of this invention to provide an updating method which makes it possible to deal with various radio conditions around a node by independently updating, when a reference value (a Target SIR) of the node is not updated for a preselected time duration, the reference value into a new reference value (a new target SIR) obtained by changing the reference value by a small value.

Other objects of this invention will become clear as the description proceeds.

Updating methods according to this invention are as follows:

(1) An updating method for use in a mobile system comprising a radio network controller, a node having a service area and connected to the radio network controller through a signal transmission line, and a user equipment which communicates with the node by radio communication within the service area of the node, uplink inner loop power control and uplink outer loop power control being carried out as transmission power control in the mobile system, the node having a target SIR (Signal to Interference Ratio) which is used in the mobile system in carrying out the uplink inner loop power control, the updating method being carried out as the uplink outer loop power control for updating the target SIR into a new target SIR and comprising the steps of:

making the radio network controller be provided with a wait-timer which produces a time-out signal when the wait-timer times a preselected time duration after the wait-timer is set;

judging in the radio network controller whether or not the radio network controller receives from the node a report representative of a radio condition around the node before the wait-timer produces the time-out signal;

updating the target SIR into the new target SIR in the radio network controller on the basis of the report when the radio network controller judges that the radio network controller receives from the node the report before the wait-timer produces the time-out signal;

again setting the wait-timer in the radio network controller when the target SIR is updated into the new target SIP in the radio network controller;

decreasing the target SIR by a predetermined value into a decreased target SIR in the radio network controller when the radio network controller judges that the radio network controller does not yet receive from the node the report when the wait-timer produces the time-out signal; and again setting the wait-timer in the radio network controller when the target SIR is decreased into the decreased target SIR in the radio network controller.

(2) An updating method as described in Paragraph (1), wherein the report represents, as the radio condition around the node, a measurement result obtained in the node by measuring a block error ratio (BLER) of an uplink signal from the user equipment for a predetermined time duration.

(3) An updating method as described in Paragraph (1), wherein the uplink inner loop power control is carried out in the mobile system by:

transmitting in the user equipment a signal to the node by the use of an uplink dedicated physical control channel for the user equipment;

receiving in the node the signal as a desired wave from the uplink dedicated physical control channel and receiving an interference wave from other channels;

measuring in the node a ratio of a power of the desired wave to another power of the interference wave as a measured SIR; and comparing in the node the measured SIR with one of the target SIR, the new target SIR, and the decreased target SIR to transmit, when the measured SIR is smaller than the one of the target SIR, the new target SIR, and the decreased target SIR, an increment command indicative of increment of a transmission power of the signal to the user equipment by the use of a downlink dedicated physical control channel for the user equipment and to transmit, when the measured SIR is larger than the one of the target SIR, the new target SIR, and the decreased target SIR, a decrement command indicative of decrement of the transmission power of the signal to the user equipment by the use of the downlink dedicated physical control channel for the user equipment.

(4) An updating method as described in Paragraph (3), wherein the report represents, as the radio condition around the node, a measurement result obtained in the node by measuring a block error ratio (BLER) of an uplink signal from the user equipment for a predetermined time duration.

(5) An updating method for use in a mobile system comprising a radio network controller, a node having a service area and connected to the radio network controller through a signal transmission line, and a user equipment which communicates with the node by radio communication within the service area of the node, uplink inner loop power control and uplink outer loop power control being carried out as transmission power control in the mobile system, the node having a target SIR (Signal to Interference Ratio) which is used in the mobile system in carrying out the uplink inner loop power control, the updating method being carried out as the uplink outer loop power control for updating the target SIR into a new target SIR and comprising the steps of:

making the radio network controller be provided with a wait-timer which produces a time-out signal when the wait-timer times a preselected time duration after the wait-timer is set;

judging in the radio network controller whether or not the radio network controller receives from the node a report representative of a radio condition around the node before the wait-timer produces the time-out signal;

calculating the new target SIR in the radio network controller on the basis of the report when the radio network controller judges that the radio network controller receives from the node the report before the wait-timer produces the time-out signal;

transmitting the new target SIR from the radio network controller to the node to make the node update the target SIR into the new target SIR;

again setting the wait-timer in the radio network controller when the target SIR is updated into the new target SIR;

calculating a decreased target SIR obtained by decreasing the target SIR by a predetermined value in the radio network controller when the radio network controller judges that the radio network controller does not yet receive from the node the report when the wait-timer produces the time-out signal;

transmitting the decreased target SIR from the radio network controller to the node to make the node update the target SIR into the decreased target SIR; and again setting the wait-timer in the radio network controller when the target SIR is updated into the decreased target SIR.

(6) An updating method as described in Paragraph (5), wherein the report represents, as the radio condition around the node, a measurement result obtained in the node by measuring a block error ratio (BLER) of an uplink signal from the user equipment for a predetermined time duration.

(7) An updating method as described in Paragraph (5), wherein the uplink inner loop power control is carried out in the mobile system by:

transmitting in the user equipment a signal to the node by the use of an uplink dedicated physical control channel for the user equipment;

receiving in the node the signal as a desired wave from the uplink dedicated physical control channel and receiving an interference wave from other channels;

measuring in the node a ratio of a power of the desired wave to another power of the interference wave as a measured SIR; and comparing in the node the measured SIR with the target SIR to transmit, when the measured SIR is smaller than the target SIR, an increment command indicative of increment of a transmission power of the signal to the user equipment by the use of a downlink dedicated physical control channel for the user equipment and to transmit, when the measured SIR is larger than the target SIR, a decrement command indicative of decrement of the transmission power of the signal to the user equipment by the use of the downlink dedicated physical control channel for the user equipment.

(8) An updating method as described in Paragraph (7), wherein the report represents, as the radio condition around the node, a measurement result obtained in the node by measuring a block error ratio (BLER) or an uplink signal from the user equipment for a predetermined time duration.

DESCRIPTION OF THE PREFERRED EMBODIMENT

Figure 1:
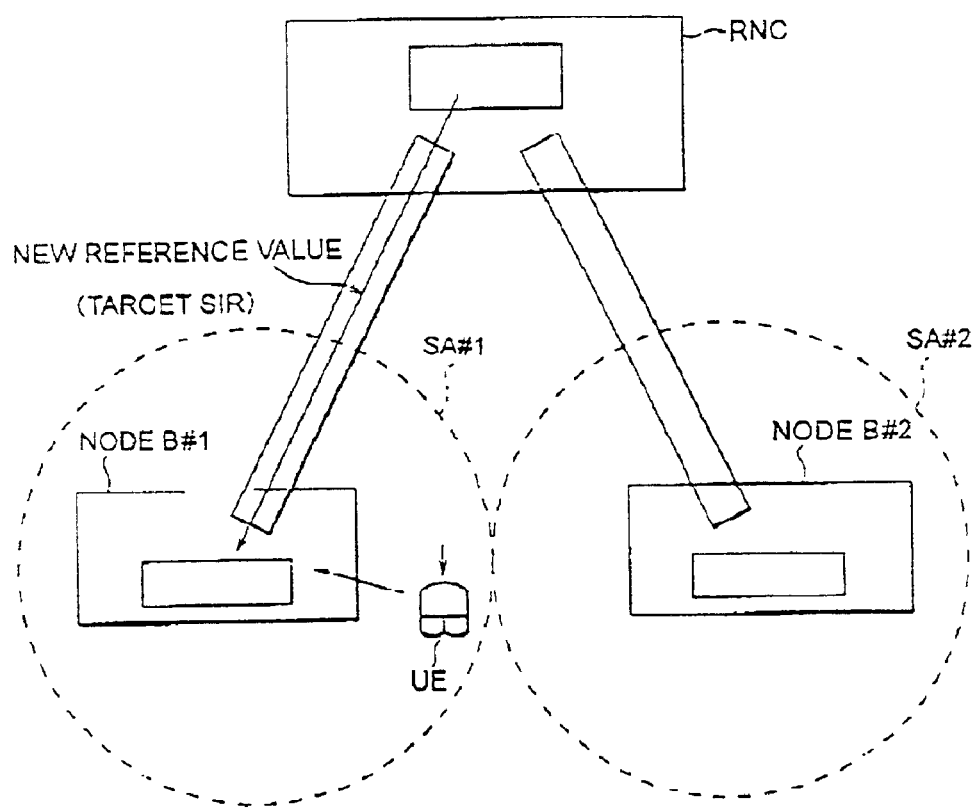
FIG. 1 is a block diagram of a third-generation mobile system which carries out an updating method according to an embodiment of this invention.

Referring to FIG. 1, a third-generation mobile system is shown which carries out an updating method according to an embodiment of this invention. The third-generation mobile system includes a radio network controller RNC, a node NODEB#1, and a user equipment UE.

The node NODEB#1 is typically a base station and is connected to the radio network controller RNC by a wire or a signal transmission line. The node NODEB#1 has a service area SA#1.

The user equipment UE is typically a mobile station. The user equipment UP can communicate with the node NODEB#1 by radio communication or wireless communication within the service area SA#1 of the node NODEB#1.

A different node NODEB#2, which is typically a different base station, is also connected to the radio network controller RNC by a different wire or a different signal transmission line. When the use equipment UE moves within a service area SA#2 of the different node NODEB#2, the user equipment UE can communicate with the different node NODEB#2 by radio communication or wireless communication.

In the third-generation mobile system, transmission power control is carried out in order to avoid a radio interference and to obtain a high communication quality.

Figure 2:
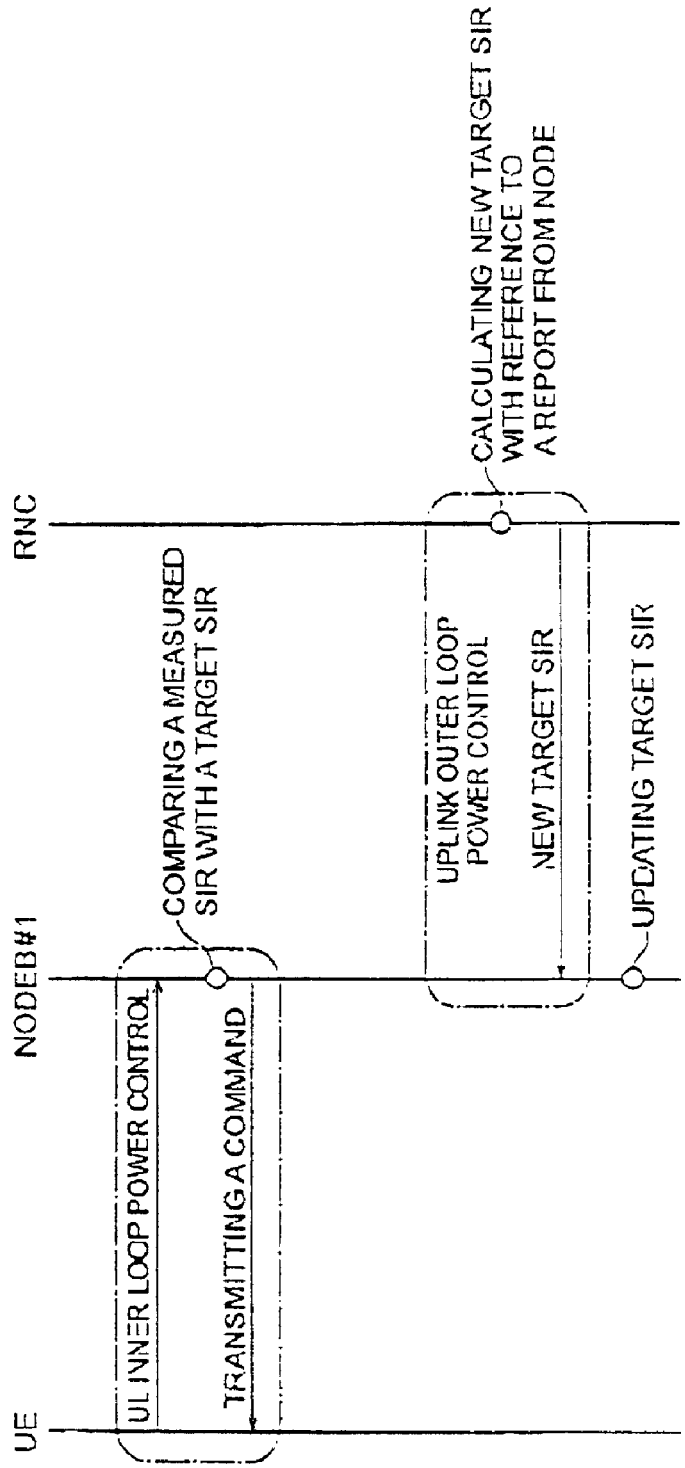
FIG. 2 is a diagram for use in describing uplink (UL) inner loop power control and uplink outer loop power control which are carried out as the transmission power in the third-generation mobile system illustrated in FIG. 1.

Referring to FIG. 2, description will be made as regards uplink (UL) inner loop power control and uplink outer loop power control which are carried out as the transmission power control in the third-generation mobile system illustrated in FIG. 1.

In the uplink (UL) inner loop power control, the user equipment UE transmits a signal to the node NODEB#1 by the use of an uplink dedicated physical control channel for the user equipment UE. The node NODEB#1 receives the signal as a desired wave from the uplink dedicated physical control channel. In this event, the node NODEB#1 inevitably receives an interference wave from other channels. When the node NODEB#1 receives the signal, the node NODEB#1 measures a ratio of a power of the desired wave to another power of the interference wave as a measured SIR (Signal to Interference Ratio). As known in the art, the ratio is usually represented by Eb/Io, where Eb represents the power of the desired wave and where Io represents the power of the interference wave.

The node NODEB#1 compares the measured SIR with a reference value (namely, a target SIR). When the measured SIR is smaller than the target SIR, the node NODEB#1 transmits, by the use of an downlink dedicated physical control channel for the user equipment UE, to the user equipment UE an increment command indicative of increment of a transmission power of the signal to make the user equipment UE increase the transmission power of the signal. When the measured SIR is larger than the target SIR by a predetermined amount or value, the node NODEB#1 transmits, by the use of the downlink dedicated physical control channel for the user equipment UE, to the user equipment UE a decrement command indicative of decrement of the transmission power of the signal to make the user equipment UE decrease the transmission power of the signal.

In the uplink outer loop power control, the radio network controller RNC updates the target SIR of the node NODEB#1 into a new reference value (namely, a new target SIR). In order to update the target SIR of the node NODEB#1, it is necessary that the radio network controller RNC knows a radio condition around the node NODEB#1 by receiving a report transmitted from the node NODEB#1. The report represents whether the radio condition has an excessive quality or a degraded quality. In order to produce the report, the node NODEB#1 has to measure a block error ratio (BLER) of an uplink signal from the user equipment UE for a predetermined time duration. The node NODEB#1 transmits to the radio network controller RNC a measurement result of the block error ratio as the report to make the radio network controller RNC update the target SIR of the node NODEB#1 into the new target SIR in accordance with the report.

As described above, the node NODEB#1 consumes a long time in measurement in order to judge that the radio condition has the excessive quality.

Figure 3:
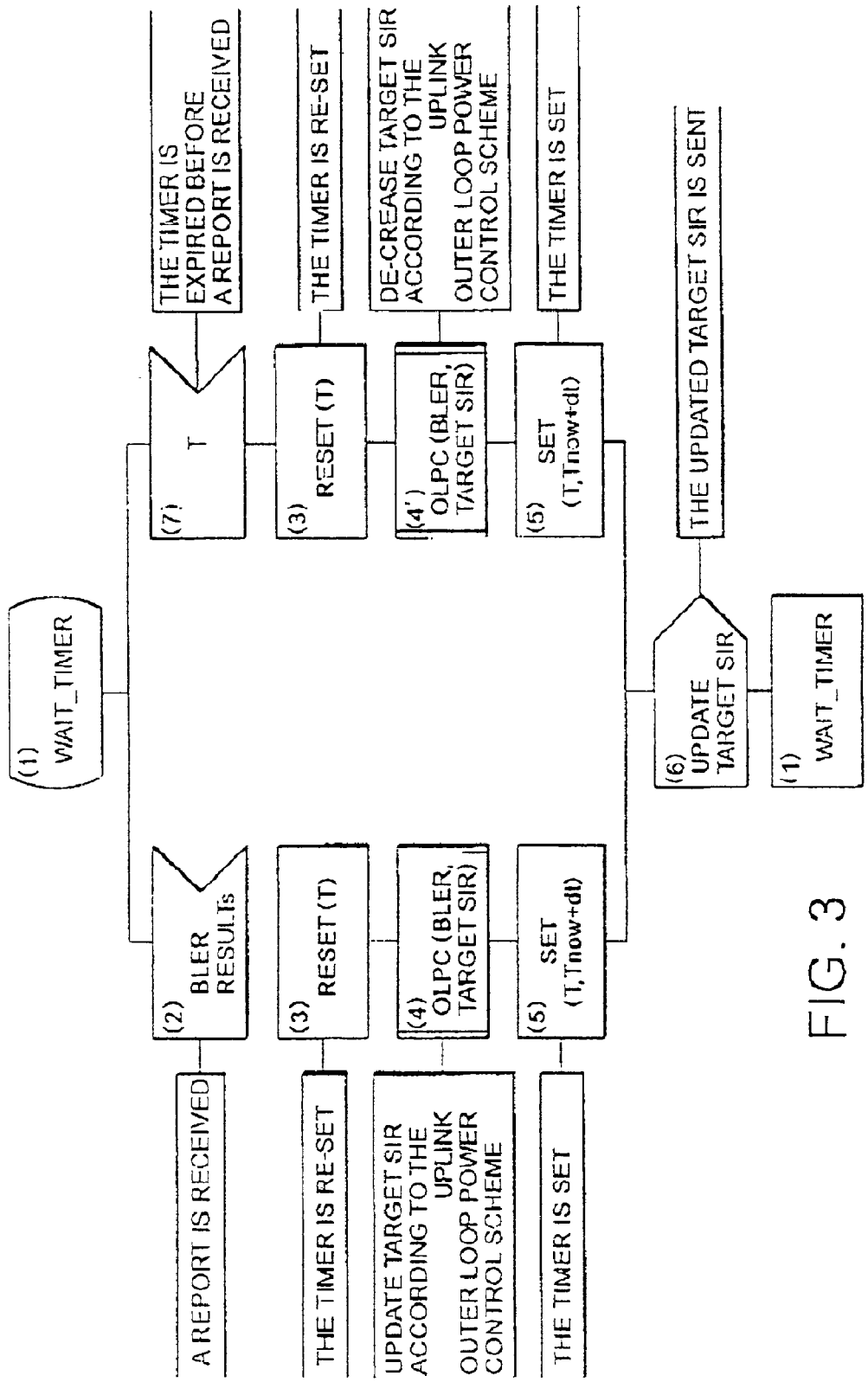
FIG. 3 is a flow chart for use in describing the updating method according to the embodiment of this invention.

Referring to FIG. 3, description will proceed to the updating method according to the embodiment of this invention. The radio network controller RNC (FIG. 1) is preliminarily made to be provided with a wait-timer which produces a time-out signal when the wait-timer times a preselected time duration (T: a wait-timer value) after the wait-timer is set.

At Stage (1) of FIG. 3, the radio network controller RNC sets the wait-timer.

At Stage (2), the radio network controller RNC receives the report from the node NODEB#1 (FIG. 1) before the wait-timer produces the time-out signal. The radio network controller RNC knows from the report that the radio condition around the node NODEB#1 has the excessive quality or the degraded quality by the block error ratio (BLER) measurement results measured in the node NODEB#1.

At Stage (7), the wait-timer produces the time-out signal before the radio network controller RNC receives the report from the node NODEB#1.

At Stage (3), the radio network controller RNC resets the wait-timer (T).

At Stage (4), the radio network controller RNC calculates the new target SIR on the basis of the block error ratio (BLER) measurement results.

At Stage (4'), the radio network controller RNC calculates a decreased target SIR which is obtained by decreasing the current target SIR by a predetermined value.

At Stage (5), the radio network controller RNC sets a new wait-timer value (Tnow+dt) as the current wait-timer value (T) into the wait-timer, taking QOS (Quality of Service) and other factors into consideration.

At Stage (6), the radio network controller RNC transmits the new target SIR or the decreased target SIR to the node NODEB#1 to make the node NODEB#1 update the current target SIR into the new target SIR or the decreased target SIR.

Thus, the updating method according to the embodiment of this invention makes it possible to deal with various radio conditions around the node NODEB#1 by independently updating, when the target SIR of the node NODEB#1 is not updated for the preselected time duration, the target SIR into the decreased target SIR obtained by changing the the target SIR by a small value.

Figure 4:
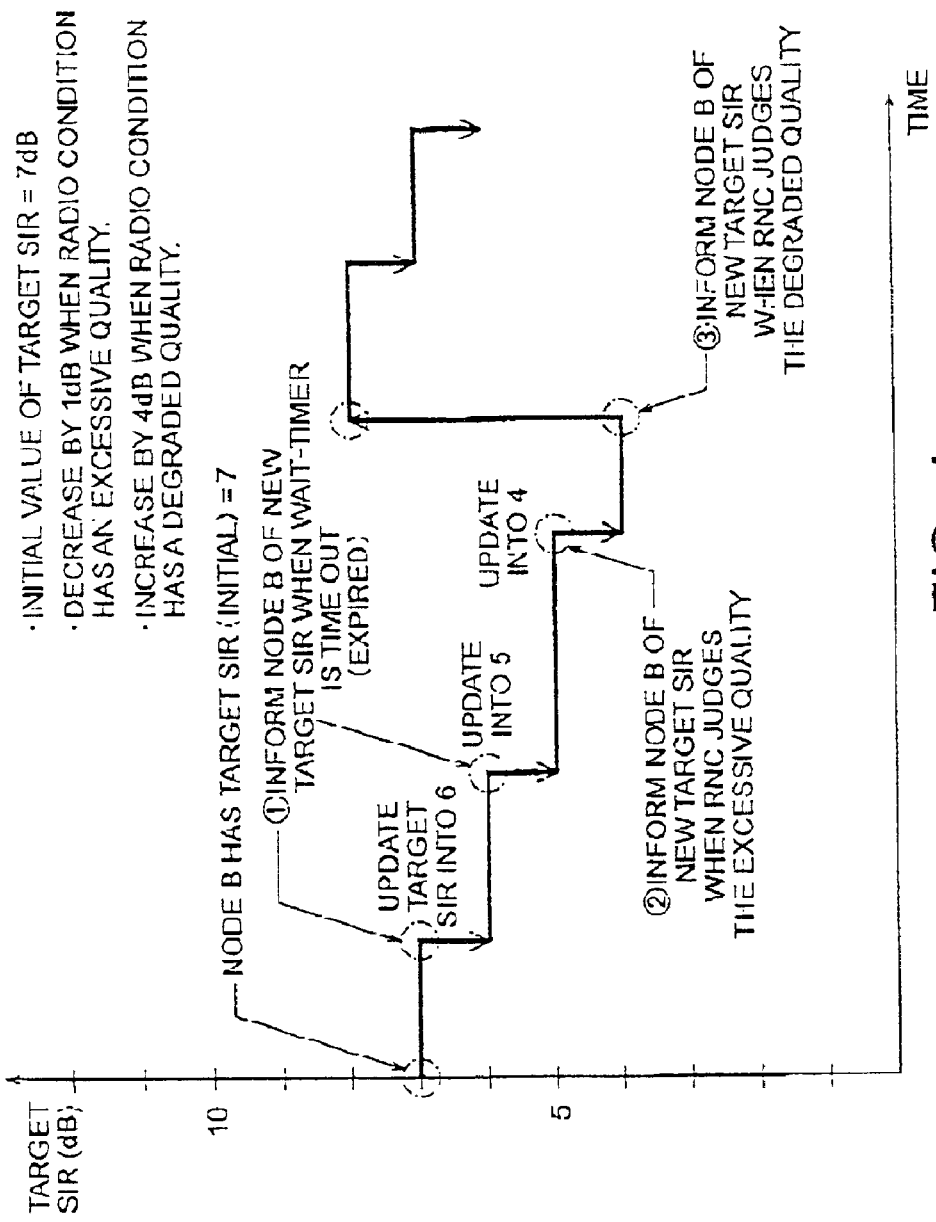
FIG. 4 is a time chart for use in describing the updating method according to the embodiment or this invention.

As typically shown in FIG. 4, before the radio network controller RNC judges that the radio condition around the node NODEB#1 is the excessive quality (see ② in FIG. 4), the target SIR of the node NODEB#1 is successively decreased into 6 and 5 (see ① in FIG. 4) whenever the wait-timer is expired.

While this invention has thus far been described in conjunction with the preferred embodiment thereof, it will readily be possible for those skilled in the art to put this invention into practice in various other manners.

What is claimed is:

1. An updating method for use in a mobile system comprising a radio network controller, a node having a service area and connected to said radio network controller through a signal transmission line, and a user equipment which communicates with said node by radio communication within the service area of said node, uplink inner loop power control and uplink outer loop power control being carried out as transmission power control in said mobile system, said node having a target SIR (Signal to Interference Ratio) which is used in said mobile system in carrying out said uplink inner loop power control, said updating method being carried out as said uplink outer loop power control for updating said target SIR into a new target SIR and comprising the steps of:

making said radio network controller be provided with a wait-timer which produces a time-out signal when said wait-timer times a preselected time duration after said wait-timer is set;

judging in said radio network controller whether or not said radio network controller receives from said node a report representative of a radio condition around said node before said wait-timer produces said time-out signal;

updating said target SIR into said new target SIR in said radio network controller on the basis of said report when said radio network controller judges that said radio network controller receives from said node said report before said wait-timer produces said time-out signal;

again setting said wait-timer in said radio network controller when said target SIR is updated into said new target SIR in said radio network controller;

decreasing said target SIR by a predetermined value into a decreased target SIR in said radio network controller when said radio network controller judges that said radio network controller does not yet receive from said node said report when said wait-timer produces said time-out signal; and again setting said wait-timer in said radio network controller when said target SIR is decreased into said decreased target SIR in said radio network controller.

2. An updating method as claimed in claim 1, wherein said report represents, as said radio condition around said node, a measurement result obtained in said node by measuring a block error ratio (BLER) of an uplink signal from said user equipment for a predetermined time duration.

3. An updating method as claimed in claim 1, wherein said uplink inner loop power control is carried out in said mobile system by:

transmitting in said user equipment a signal to said node by the use of an uplink dedicated physical control channel for said user equipment;

receiving in said node the signal as a desired wave from the uplink dedicated physical control channel and receiving an interference wave from other channels;

measuring in said node a ratio of a power of said desired wave to another power of said interference wave as a measured SIR; and comparing in said node said measured SIR with one of said target SIR, said new target SIR, and said decreased target SIR to transmit, when said measured SIR is smaller than said one of the target SIR, the new target SIR, and the decreased target SIR, an increment command indicative of increment of a transmission power of said signal to said user equipment by the use of a downlink dedicated physical control channel for said user equipment and to transmit, when said measured SIR is larger than said one of the target SIR, the new target SIR, and the decreased target SIR, a decrement command indicative of decrement of the transmission power of said signal to said user equipment by the use of said downlink dedicated physical control channel for said user equipment.

4. An updating method as claimed in claim 3, wherein said report represents, as said radio condition around said node, a measurement result obtained in said node by measuring a block error ratio (BLER) of an uplink signal from said user equipment for a predetermined time duration.

5. An updating method for use in a mobile system comprising a radio network controller, a node having a service area and connected to said radio network controller through a signal transmission line, and a user equipment which communicates with said node by radio communication within the service area of said node, uplink inner loop power control and uplink outer loop power control being carried out as transmission power control in said mobile system, said node having a target SIR (Signal to Interference Ratio) which is used in said mobile system in carrying out said uplink inner loop power control, said updating method being carried out as said uplink outer loop power control for updating said target SIR into a new target SIR and comprising the steps of:

making said radio network controller be provided with a wait-timer which produces a time-out signal when said wait-timer times a preselected time duration after said wait-timer is set;

judging in said radio network controller whether or not said radio network controller receives from said node a report representative of a radio condition around said node before said wait-timer produces said time-out signal;

calculating said new target SIR in said radio network controller on the basis of said report when said radio network controller judges that said radio network controller receives from said node said report before said wait-timer produces said time-out signal;

transmitting said new target SIR from said radio network controller to said node to make said node update said target SIR into said new target SIR:

again setting said wait-timer in said radio network controller when said target SIR is updated into said new target SIR;

calculating a decreased target SIR obtained by decreasing said target SIR by a predetermined value in said radio network controller when said radio network controller judges that said radio network controller does not yet receive from said node said report when said wait-timer produces said time-out signal;

transmitting said decreased target SIR from said radio network controller to said node to make said node update said target SIR into said decreased target SIR; and again setting said wait-timer in said radio network controller when said target SIR is updated into said decreased target SIR.

6. An updating method as claimed in claim 5, wherein said report represents, as said radio condition around said node, a measurement result obtained in said node by measuring a block error ratio (BLER) of an uplink signal from said user equipment for a predetermined time duration.

7. An updating method as claimed in claim 5, wherein said uplink inner loop power control is carried out in said mobile system by:

transmitting in said user equipment a signal to said node by the use of an uplink dedicated physical control channel for said user equipment;

receiving in said node the signal as a desired wave from the uplink dedicated physical control channel and receiving an interference wave from other channels;

measuring in said node a ratio of a power of said desired wave to another power of said interference wave as a measured SIR; and comparing in said node said measured SIR with said target SIR to transmit, when said measured SIR is smaller than said target SIR, an increment command indicative of increment of a transmission power of said signal to said user equipment by the use of a downlink dedicated physical control channel for said user equipment and to transmit, when said measured SIR is larger than said target SIR, a decrement command indicative of decrement of the transmission power of said signal to said equipment by the use of said downlink dedicated physical control channel for said user equipment.

8. An updating method as claimed in claim 7, wherein said report represents, as said radio condition around said node, a measurement result obtained in said node by measuring a block error ratio (BLER) of an uplink signal from said user equipment for a predetermined time duration.

* * * * *